(12) United States Patent
McElhinnney

(10) Patent No.: US 6,321,456 B1
(45) Date of Patent: Nov. 27, 2001

(54) METHOD OF SURVEYING A BORE HOLE

(75) Inventor: Graham McElhinnney, Aberdeenshire (GB)

(73) Assignee: Halliburton Energy Services, Inc.

( * ) Notice: Subject to any disclaimer, the term of this patent is extended or adjusted under 35 U.S.C. 154(b) by 0 days.

(21) Appl. No.: 09/137,615

(22) Filed: Aug. 21, 1998

(30) Foreign Application Priority Data

Aug. 22, 1997 (GB) ................................................ 9717975

(51) Int. Cl.$^7$ ................................................ E21B 47/022
(52) U.S. Cl. ................................ 33/313; 33/304; 33/356
(58) Field of Search ............................... 33/1 E, 1 H, 300, 33/301–304, 313, 355 R, 544, 356, 357; 324/346; 175/45, 50; 166/255.2

(56) References Cited

U.S. PATENT DOCUMENTS

| | | | |
|---|---|---|---|
| Re. 33,708 | * 10/1991 | Roesler | 33/304 |
| 4,682,421 | * 7/1987 | Van Dongen et al. | 33/302 |
| 4,700,142 | * 10/1987 | Kuckes | 33/304 |
| 4,794,336 | * 12/1988 | Marlow et al. | 33/302 |
| 4,909,336 | * 3/1990 | Brown et al. | 33/304 |
| 5,103,177 | * 4/1992 | Russell et al. | 324/346 |
| 5,230,387 | * 7/1993 | Waters et al. | 33/313 |
| 5,258,755 | * 11/1993 | Kuckes | 33/355 R |
| 5,321,893 | 6/1994 | Engebretson . | |
| 5,512,830 | 4/1996 | Kuckes . | |
| 5,821,414 | * 10/1998 | Noy et al. | 33/304 |
| 6,021,577 | * 2/2000 | Shiells et al. | 33/304 |

FOREIGN PATENT DOCUMENTS

| | | |
|---|---|---|
| 2 086 055 | 5/1982 | (GB) . |
| 2301 438 | 12/1996 | (GB) . |
| WO 97/10413 | 3/1997 | (WO) . |

* cited by examiner

*Primary Examiner*—Andrew H. Hirshfeld
(74) *Attorney, Agent, or Firm*—Conley, Rose & Tayon, P.C.

(57) ABSTRACT

A method for determining azimuth in well bore hole where the well is being drilled utilizing Measurement-While-Drilling (MWD) equipment, including gravitometer and magnetometer instruments in the presence of an adjacent well. Interference fields introduced by adjacent wells are modeled as a single or series of magnetic dipoles. The interference fields axial interference field IBz is tracked and a position determined where the IBz component is at its maximum, minimum or a zero value. The total magnetic field is then measured at that point and the magnetic inclination and therefrom, the azimuth may be determined. Alternately, the interference field in the x,y plane (IB(x,y)) may be tracked and a position determined where the IB(x,y) component is equal to a minimum, maximum or zero value. The azimuth may then be determined by an alternate numeric or curve fitting methods.

20 Claims, 2 Drawing Sheets

ADJACENT WELL WITH MAGNETIC STEEL COMPONENTS

METHOD OF SURVEYING A BORE HOLE

BACKGROUND OF THE INVENTION

This invention relates to a new method for improved surveying of a bore hole using a magnetic survey device. More particularly, this invention relates to a method for determination of the azimuth of a bore hole.

Where magnetic survey instruments are used in the determination of the azimuth of a bore hole, it is the normal practice to relate the magnetic information to the Earth's magnetic field in the determination of the measurement azimuth of the bore hole. The problem is getting accurate magnetic surveys when in close proximity to an adjacent well due to the magnetic interference from magnetic steel components like liners, casing, fish etc., of an adjacent well hole. These components distort the measured magnetic field (TMF(x,y,z)) leading to errors in the calculated azimuth of the bore hole. The magnetic interference field (IB(x,y,z)) coming from the adjacent well is derived from a series of magnetic poles of unknown strength and location. If the location of the poles and/or their effect on certain axes of the magnetic instrument were known then the true Earth's field and accurate surveys could be derived. However, it is more common for the magnetism in the adjacent well's tubular not to be known, neither the pole strengths nor their location. In this instance, this new invention allows an improved azimuth of the well being drilled to be derived.

SUMMARY OF THE PRESENT INVENTION

From one aspect, the present invention provides a method that determines where an interference field is at right angles to the well being drilled.

Preferably, this is done by monitoring the total measured magnetic field components in the x and y directions, TMF B(x,y), and determining a maximum value. The value Bz at that position is determined with the expectation that the vertical, or z component, of the interfering field IBz=0 and Bz is not subjected to any interference. The same is true for the TMF B(x,y) minimum value, that is Bz may be determined based on the assumption that IBz=0.

From another aspect, the present invention provides a method for deriving the azimuth of a bore hole comprising the steps of predicting the position where the interference from an adjacent well containing magnetic steel tubular components affects solely the B(x,y) plane or the Bz axis, monitoring the IB(x,y) interference field and/or the IBz interference field to determine the position where B(x,y) and/or Bz are solely affected, calculating at or near one or more of these positions the azimuth of the bore hole by taking measurements of the gravity field along three axes, G(x,y,z) and by taking measurements along three axis B(x,y,z) of the magnetic field. According to the present invention, there is provided a method for surveying a bore hole using a magnetic survey device, comprising the steps of:

monitoring the magnetic field;
resolving an interference constituent of the magnetic field arising from at least one magnetic component contained within an adjacent bore hole;
determining at least one position along the bore hole where either an axial component of the interference constituent in the z-direction IB(z) is at least one of a set of certain values, or where a resultant vector IB(x,y) of axial components of the interference constituent in the x- and y- directions is at least one of said set of certain values; and measuring the magnetic field at or near to said position; wherein the z-direction is aligned along said bore hole, and wherein when said axial component in the z-direction IB(z) is one of said certain values and/or the resultant vector IB(x,y) is one of said certain values then at least one of said axial component IB(z) or said resultant vector IB(x,y) is zero, whereby said magnetic field may be measured without interference in at least one axis.

The monitoring can be carried out continuously or at regular intervals. Also, it is arranged that the Z axis is preferably along the long axis of the measurement device.

BRIEF DESCRIPTION OF THE DRAWINGS

In order that the invention may be more readily understood, an embodiment thereof will now be described by way of example with reference to the accompanying drawings, in which.

DETAILED DESCRIPTION OF THE PREFERRED EMBODIMENTS

Figure 1:
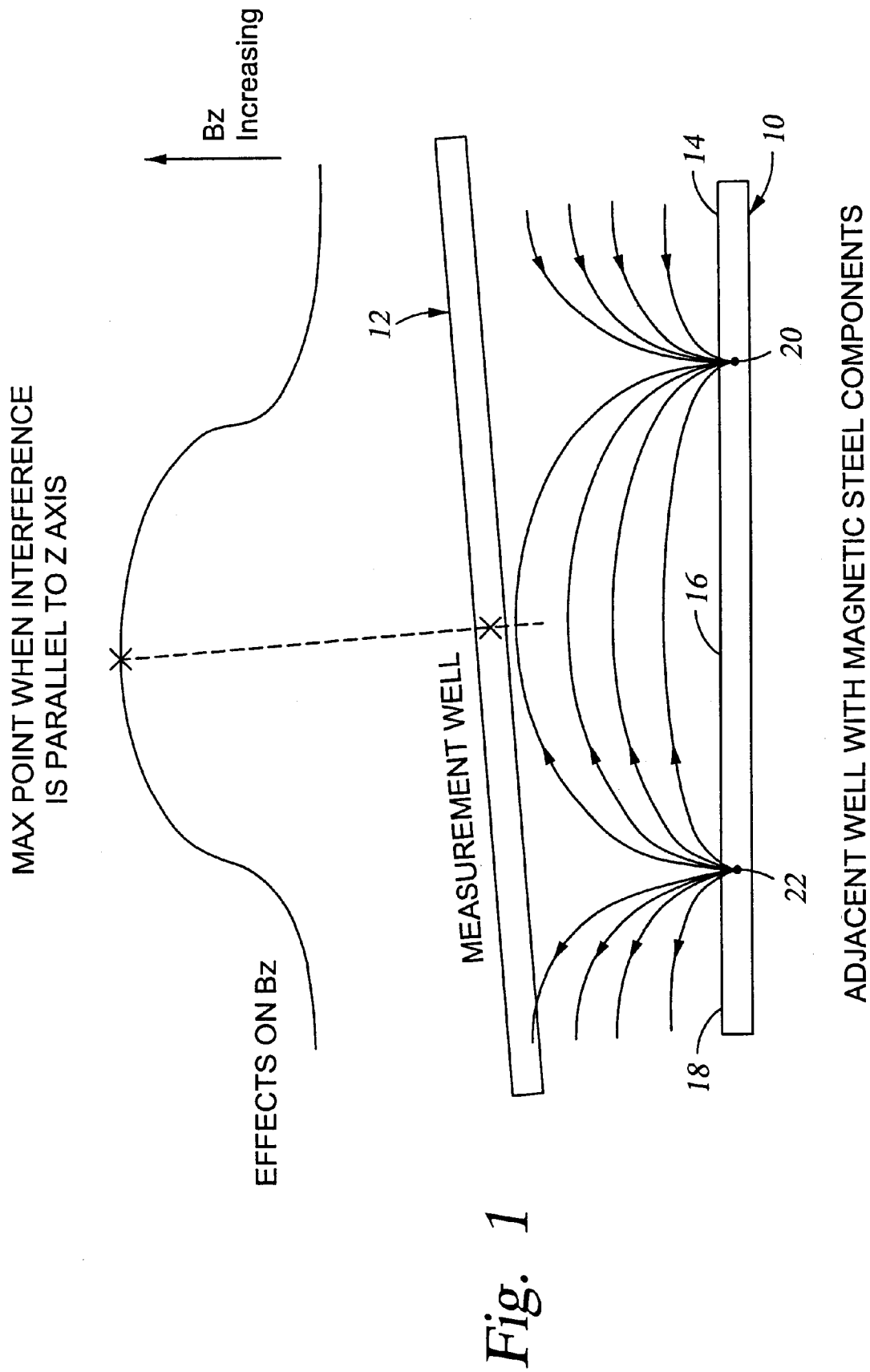
FIG. 1 shows a diagrammatic representation of the effects on Bz in a bore hole located adjacent to an existing well.

Referring to FIG. 1, consider two wells, one existing well containing magnetic steel tubular components 10 and a second well 12 being drilled near by. The existing well with the steel components contains within the components a series of magnetic poles of unknown strength and location. Typically, the interference fields may be thought of as a series of magnetic dipoles corresponding to sections of drill pipe, tubing or casing, 14, 16, 18, having poles 20, 22. The well being drilled 12 contains a device or devices for measuring the magnetic and gravity fields. Such devices are well known in the field of measurement-while-drilling (MWD). The measured magnetic field TMF(x,y,z) may be influenced by a combination of sources, e.g. the Earth's magnetic field, the bottom hole assembly (BHA) or drill string magnetism as disclosed in earlier Patent Application No. EP 96303391.5, also assigned to Halliburton Energy Services, Inc., as well as by the magnetism of the adjacent existing well 10.

The measured field (TMF) is a sum of the combined fields, therefore it is important to be able to separate the components of each contributing field for the purpose of either deriving the azimuth of the bore hole being drilled (from the Earth's field) or for providing information on other sources, i.e. distance to an adjacent well (Patent Application No. EP 95303206.7). With the exception of the Earth's magnetic field (B) and the magnetic field from the adjacent well (IB) it is important to remove or minimise the effects of other main sources of magnetic interference, if present. Other such sources may be, for example, BHA or drill string interference, and may be removed or minimised by techniques such as have been described in Patent Application No. EP 96303391.5.

Figure 2:
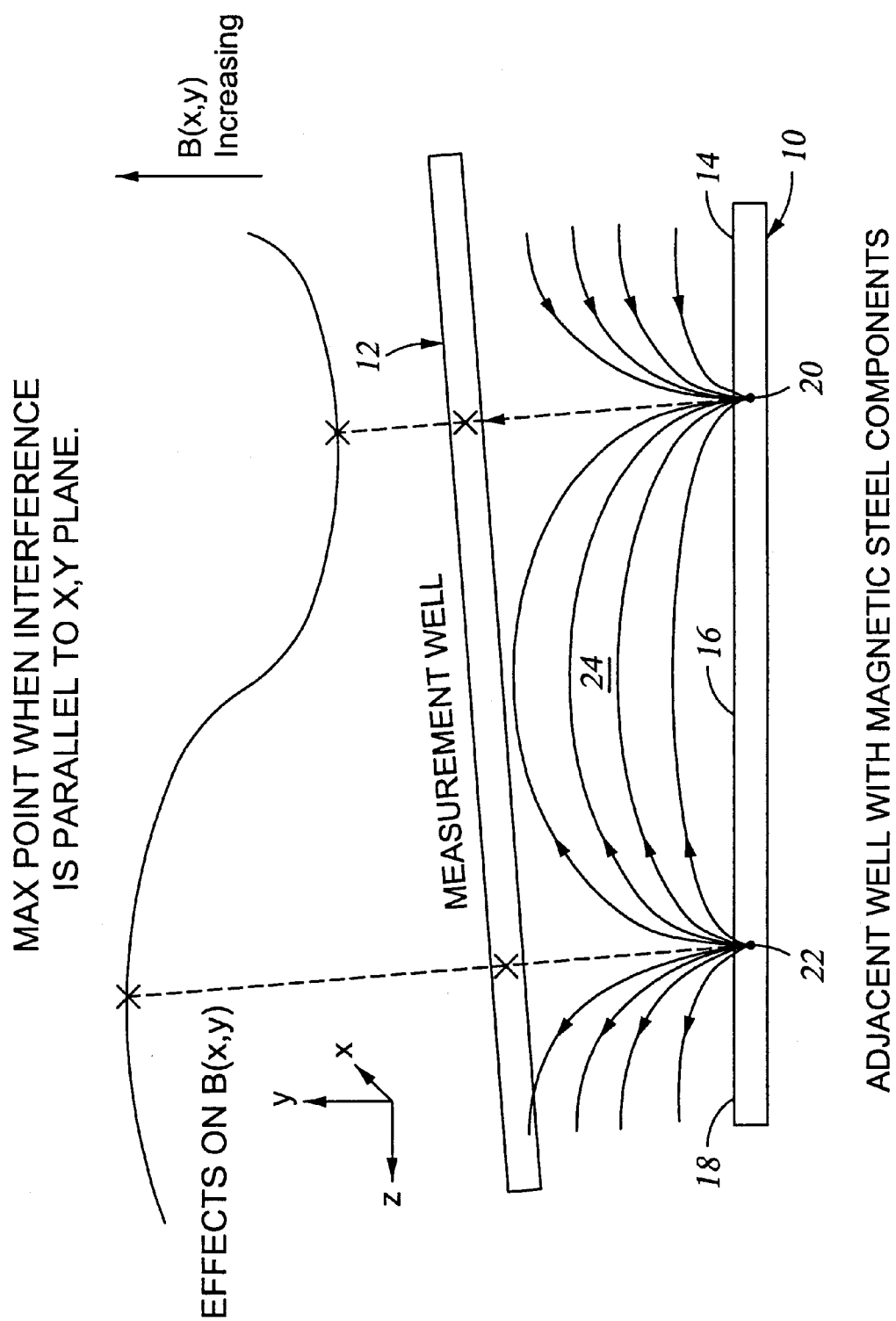
FIG. 2 shows a diagrammatic representation of the effects on B(x,y) in a bore hole located adjacent to an existing well.

Referring now to FIG. 2, the magnetic field 24 coming from the adjacent well 10 can be considered as a series of discret poles 20,22, of unknown strength and position. When the measurement device has its long axis (z) at right angles to the interference flux 24 coming from a magnetic pole 20 or 22 on the adjacent well 10, the interference field 24 influence is only cross axial to the well being drilled 12. This can be expressed as follows:

$$ITMF(Bx,y,z) = ITMF(Bx,y) = SQRT(IB_y^2 + IB_x^2) \quad (1)$$

Where the above result is at its maximum or minimum value, when IBz=0.

It is possible to determine this position when the interference flux is at right angles if the amount of data is sufficient to allow statistical determination. Other techniques which may be used to identify maximum and minimum values may include standard curve fitting techniques. This can be accomplished by monitoring the value of ITMF(Bx,y). ITMF(Bx,y) changes from ITMF(Bx,y)=0 to a ITMF(Bx,y) maximum or minimum value at a position when the long axis (z-axis) is at a right angle to the interference flux 24. At this position, IBz=0 and the azimuth can be resolved by:

$$\text{Inc}=\text{Tan}^{-1}((\text{SQRT}(G_x^2+G_y^2)/G_z) \quad (2)$$

$$\text{MInc}=\text{Tan}^{-1}((\text{SQRT}(\text{TMF}^2-B_z^2))/B_z) \quad (3)$$

$$\text{Azi1}=\text{Cos}^{-1}(((\text{Cos MInc}-\text{CosInc})*(\text{SinMDip}))/(\text{Sin Inc}*\text{CosMDip})) \quad (4)$$

$$\text{Azi2}=360-\text{Cos}^{-1}(((\text{Cos MInc}-\text{CosInc})*(\text{SinMDip}))/(\text{Sin Inc}*\text{CosMDip})) \quad (5)$$

where Inc is the gravitationally determined inclination and MInc is the magnetically determined inclination and wherein MDip and TMF are taken from reference data. It should be noted that other techniques known in the art may be used to solve for azimuth.

The above equations give two solutions (Azi1, Azi2) for azimuth that are a mirror image across the north/south magnetic axis. Any previous knowledge of the azimuth would help to resolve which one is correct or, for instance, if it is known that the well was going left or right this also can be used to indicate which solution is correct.

Alternatively, as shown in FIG. 1, one may use a Bz maximum or minimum where IBx=0 and IBy=0, and thus utilize Bx and By to derive the Azimuth by substitution of equation (3) with $$\text{MInc}=\text{Tan}^{-1}(\text{SQRT}(B_x^2+B_y^2)/\text{SQRT}(\text{TMF}-(B_x^2+B_y^2))) \quad (6)$$

or by the use of any other Bz type drill string magnetisation correction technique***. One difficulty of the use of the IBz maximum/minimum technique is that the z axis of the tool must be parallel to the IBz vector. The simplest way to arrange this is for the inclination and true vertical depth to be the same on both the target well 10 and the well being drilled 12. This is not always possible, but in situations where it can be achieved the technique can be usefully applied. On the other hand, the Bx,y maximum/minimum method described above can be used at almost every inclination and azimuth.

In order to use either of the above methods for calculation of Azimuth, the ITMF(Bx,y) maximum/minimum or IBz maximum/minimum positions must be measured or resolved. Continuous monitoring can be done by transmitting the information to the surface using a variety of conventional techniques, or by storing the information in memory along with the other sensor readings required for the calculations. Alternatively it is possible to program a downhole device to determine the ITMF(Bx,y) maximum/minimum and/or the IBz maximum/minimum positions and calculate and transmit or store the corrected azimuth.

The Bx,y method described above is sufficient to remove the effects of a dipole or series of dipoles (FIG. 1, 14, 16, 18) in an adjacent well 10 when the measurement bore hole 12 is drilled in any direction or inclination. Dipoles typically have an interference flux which, in the most part, follows curved paths that radiate from the long axis of the tubulars 14, 16, 18. When the measurement well 12 is in close proximity to the adjacent well 10 the amount of change in IB(x,y) and IBz is large which makes detection of the positions required for a solution relatively easy. As the interference reduces in magnitude, i.e. at greater distances from the adjacent well 10, there is less which can introduce error in the derived azimuth. In this case, the interference on the Azimuth of the measurement well 12 is reduced and therefore the interference effect is of less consequence. The Bz and Bxy curves can be derived from standard curve fitting techniques if the data density is insufficient. This allows the calculation of the preferred positions and the subsequent correct azimuths.

In addition to measuring the magnetic and gravitational fields of the positions, where either ITMF(Bx,y) is at a maximum/minimum value or IBz is at a maximum/minimum value, it is also possible to measure at those points where the components of the interference field are themselves zero. In this case, the appropriate of the above equations (3) or (6) must be used respectively when IB(z)=0 or ITMF(Bx,y)=0, in order to calculate the correct azimuth.

Survey System in Operation.

Bxy is the preferred technique for the reasons mentioned above. It is required to determine the ITMF(Bx,y) maximum/minimum position with respect to the adjacent wells interference flux from its magnetic poles as described above. There must be sufficient data in order to determine this position. Also it is preferable for information from all the sensors to be made available at or near these specific locations. Due to the diversity of tools and their modes of operation there is a considerable number of ways the above can be achieved. An example of drilling the measurement well with an MWD tool is described below.

During drilling, continuous transmission of Bx,By & Bz occurs. This allows the location or derivation of the preferred positions. The MWD tool can be programmed to intermittently transmit all sensor data (Gx, Gy, Gz, Bx, By, Bz). This allows the relevant data to be gathered at or near the preferred positions and the corrected azimuth to be derived.

What is claimed:

1. A method for surveying a first bore hole using a magnetic survey device, comprising:
   monitoring a magnetic field within the first bore hole;
   monitoring the effect on the magnetic field of an interference magnetic field generated by a source in an adjacent bore hole;
   positioning the device in the first bore hole so that either a vertical component or a resultant vector of the interference magnetic field is zero; and
   measuring the magnetic field in the first bore hole at or near to the position.

2. The method of claim 1 wherein the resultant vector is at a maximum or a minimum value when the vertical component is zero, and wherein the vertical component is at a maximum or a minimum value when the resultant vector is zero.

3. The method of claim 1 wherein the resultant vector is zero when a longitudinal axis of the device is parallel to the vertical component.

4. The method of claim 1 further including measuring a gravitational field at or near to the position.

5. The method of claim 4 further including calculating the azimuth of the first bore hole.

6. A method for surveying a first bore hole using a magnetic survey device, comprising:

monitoring a magnetic field within the first bore hole;

resolving an interference constituent of the magnetic field arising from at least one magnetic source contained within an adjacent bore hole;

determining at least one position along the first bore hole where either an axial component of the interference constituent in the z-direction IB(z) is at least one of a set of certain values, or where a resultant vector IB(x,y) of axial components of the interference constituent in the x- and y-directions is at least one of said set of certain values; and measuring the magnetic field at or near to said position; wherein the z-direction is aligned along the first bore hole, and wherein when said axial component in the z-direction IB(z) is one of said certain values or when the resultant vector IB(x,y) is one of said certain values then at least one of said axial component IB(z) or said resultant vector IB(x,y) is zero, whereby said magnetic field may be measured without interference in at least one axis.

7. A method according to claim 6 wherein said set of certain values consists of a maximum value, a minimum value, and zero.

8. A method according to claim 7 wherein the monitoring of the magnetic field is continuous and is performed at every point along a length of the first bore hole.

9. A method according to claim 8 wherein the data collected during the monitoring is transmitted to a surface either intermittently or in real-time or is stored in the magnetic survey device for later retrieval.

10. A method according to claim 7, further comprising:

measuring a gravitational field at or near to said position; and calculating an azimuth of the first bore hole using the measurement of the gravitational field and the measurement of the magnetic field each taken at or near to said position.

11. A method according to claim 10 wherein the monitoring of the magnetic field is continuous and is performed at every point along a length of the bore first hole.

12. A method according to claim 11 wherein the data collected during the monitoring is transmitted to a surface either intermittently or in real-time or is stored in the magnetic survey device for later retrieval.

13. A method according to claim 10 wherein the calculation of the azimuth of the first bore hole is performed using a first set of standard equations when IB(z) is a maximum or minimum, or alternatively using a second set of standard equations when IB(x,y) is a maximum or minimum.

14. A method according to claim 13 wherein the monitoring of the magnetic field is continuous and is performed at every point along a length of the first bore hole.

15. A method according to claim 14 wherein the data collected during the monitoring is transmitted to a surface either intermittently or in real-time or is stored in the magnetic survey device for later retrieval.

16. A method according to claim 13, wherein the calculation of the azimuth of the first bore hole is performed using said first set of equations when IB(x,y) equals zero, and using said second set of equations when IB(z) equals zero.

17. A method according to claim 16 wherein the monitoring of the magnetic field is continuous and is performed at every point along a length of the first bore hole.

18. A method according to claim 17 wherein the data collected during the monitoring is transmitted to a surface either intermittently or in real-time or is stored in the magnetic survey device for later retrieval.

19. A method according to claim 6 wherein the monitoring of the magnetic field is continuous and is performed at every point along a length of the first bore hole.

20. A method according to claim 19 wherein the data collected during the monitoring is transmitted to a surface either intermittently or in real-time or is stored in the magnetic survey device for later retrieval.

* * * * *

UNITED STATES PATENT AND TRADEMARK OFFICE
CERTIFICATE OF CORRECTION

PATENT NO.    : 6,321,456 B1
DATED         : November 27, 2001
INVENTOR(S)   : Graham McElhinney It is certified that error appears in the above-identified patent and that said Letters Patent is hereby corrected as shown below:

<u>Title page,</u>
Item [75], Inventor: change "McElhinnney" to -- McElhinney -- and after "Aberdeenshire" add -- Scotland --

Signed and Sealed this

Sixteenth Day of July, 2002

Attest:

Attesting Officer

JAMES E. ROGAN
*Director of the United States Patent and Trademark Office*